US005621182A

United States Patent [19]

Matsumoto

[11] Patent Number: 5,621,182

[45] Date of Patent: Apr. 15, 1997

[54] KARAOKE APPARATUS CONVERTING SINGING VOICE INTO MODEL VOICE

[75] Inventor: Shuichi Matsumoto, Hamamatsu, Japan

[73] Assignee: Yamaha Corporation, Hamamatsu, Japan

[21] Appl. No.: 618,979

[22] Filed: Mar. 20, 1996

[30] Foreign Application Priority Data

Mar. 23, 1995 [JP] Japan .................................... 7-064192

[51] Int. Cl.$^6$ .............................. G09B 5/00; G09B 15/04

[52] U.S. Cl. ................................ 84/610; 84/634; 84/650; 434/307 A

[58] Field of Search .............................. 84/609, 610, 616, 84/634, 649, 650; 434/307 A

[56] References Cited

U.S. PATENT DOCUMENTS 5,434,949 7/1995 Jeong ..................................... 395/2.79

5,447,438 9/1995 Watanabe et al. .................. 434/307 A 5,477,003 12/1995 Muraki et al. ............................ 84/610

5,518,408 5/1996 Kawashima et al. ............... 434/307 A 5,521,326 5/1996 Sone .......................................... 84/631

*Primary Examiner*—William M. Shoop, Jr.
*Assistant Examiner*—Marlon Torriano Fletcher
*Attorney, Agent, or Firm*—Loeb & Loeb LLP

[57] ABSTRACT

In a karaoke apparatus, a memory device stores song data containing at least accompaniment information representative of a karaoke accompaniment of a desired song and vocal information representative of a model singing voice of the song performed by a model singer. A producing device processes the stored accompaniment information to produce the karaoke accompaniment. An input device collects an actual singing voice performed in parallel to the karaoke accompaniment by a karaoke player. A reading device reads out the vocal information from the memory device in parallel to the karaoke accompaniment. A modifying device modifies at least a volume and a pitch of the model singing voice represented by the read vocal information according to an actual volume and an actual pitch of the collected actual singing voice. An output device sounds the modified model singing voice in place of the collected actual singing voice and in parallel to the karaoke accompaniment.

6 Claims, 4 Drawing Sheets

KARAOKE APPARATUS CONVERTING SINGING VOICE INTO MODEL VOICE

BACKGROUND OF THE INVENTION

The present invention relates to a karaoke apparatus, and more particularly to a karaoke apparatus capable of changing a live singing voice to a model voice of an original singer of a karaoke song.

There has been proposed a karaoke apparatus that can variably process a live singing voice to make a karaoke player sing joyful or sing better. In such a karaoke apparatus, there is known a voice converter device to alter the singing voice drastically to make the voice queer or funny. Further, a sophisticated karaoke apparatus can create a chorus voice having a three-step higher pitch from the singing voice to make harmony, for instance.

Karaoke players desire that they would sing like a professional singer (original singer) of an entry karaoke song. However, in the conventional karaoke apparatus, it was not possible to convert the voice of the karaoke player into a model voice of the professional singer.

SUMMARY OF THE INVENTION

The object of the present invention is to provide a karaoke apparatus by which a karaoke player can sing in a modified voice like the original singer of the karaoke song.

According to the present invention, a karaoke apparatus comprises a memory device that stores song data containing at least accompaniment information representative of a karaoke accompaniment of a desired song and vocal information representative of a model singing voice of the song performed by a model singer, a producing device that processes the stored accompaniment information to produce the karaoke accompaniment, an input device that collects an actual singing voice performed in parallel to the karaoke accompaniment by a karaoke player, a reading device that reads out the vocal information from the memory device in parallel to the karaoke accompaniment, a modifying device that modifies at least a volume and a pitch of the model singing voice represented by the read vocal information according to an actual volume and an actual pitch of the collected actual singing voice, and an output device that sounds the modified model singing voice in place of the collected actual singing voice and in parallel to the karaoke accompaniment.

According to the voice converting karaoke apparatus of the invention, the song data of the desired karaoke song is stored in the song data memory device. The song data contains the model singing voice information of a particular model person such as an original singer of the karaoke song. The karaoke accompaniment is performed based on the song data, and the model singing voice is read out, in synchronism with the performance from the song data memory device. During the karaoke performance, the actual singing voice of the karaoke player is picked up by the singing voice input device such as a microphone. The actual volume and pitch of the actual singing voice is extracted, and the volume and pitch of the model singing voice reproduced in synchronism with the karaoke performance is modified according to the extracted actual volume and pitch information. The modified model singing voice is mixed with the karaoke accompaniment sound of the karaoke song, and is reproduced as if the modified model singing voice is voiced by the karaoke player. Thus, the reproduced karaoke singing voice originates from the model singer, and is controlled in response to the actual voice signal of the karaoke player, so that it is possible to produce a karaoke output as if the karaoke player sings like the model singer of the karaoke song.

DETAILED DESCRIPTION OF THE INVENTION

Figure 1:
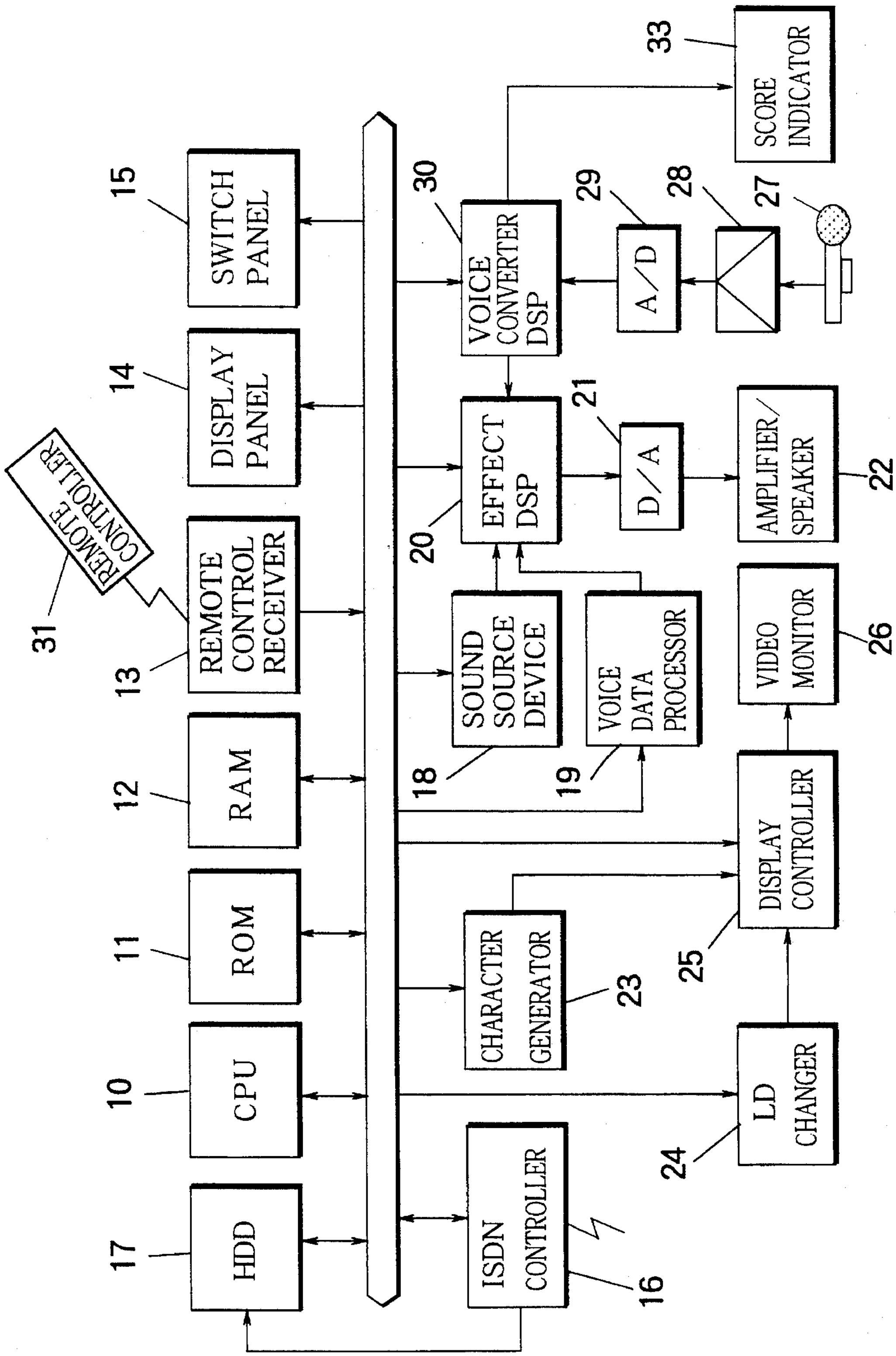
FIG. 1 is a schematic block diagram showing a voice converting karaoke apparatus according to the present invention.

Details of an embodiment of the karaoke apparatus having voice converting function according to the present invention will now be described with reference to the drawings. The karaoke apparatus of the invention is so-called a sound source karaoke apparatus. The sound source karaoke apparatus generates instrumental accompaniment sounds by driving a sound source according to song data. Further, the karaoke apparatus of the invention is structured as a network communication karaoke device, which connects to a host station through communication network. The karaoke apparatus receives the song data downloaded from the host station, and stores the song data in a hard disk drive (HDD) 17 (FIG. 1 ). The hard disk drive 17 can store several hundreds to several thousands of the song data files. The voice converting function of the present invention is not to output the karaoke player's actual singing voice collected by a microphone 27 as it is, but to convert it to a model singing voice of an original singer while modifying a model singing voice according to an actual singing voice. Specific vocal information to enable such a voice conversion is stored as a part of the song data in the hard disk drive 17.

Figure 3:
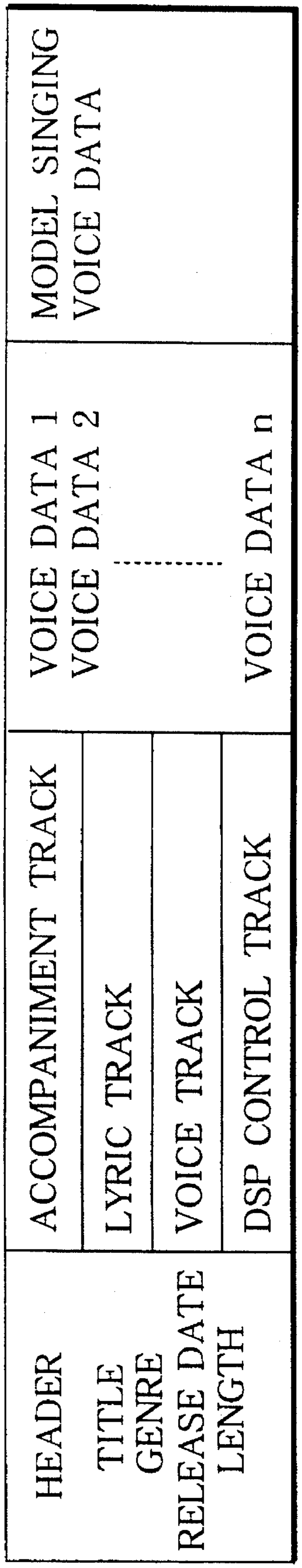
FIG. 3 shows configuration of song data utilized in the karaoke apparatus.
Figure 4A:
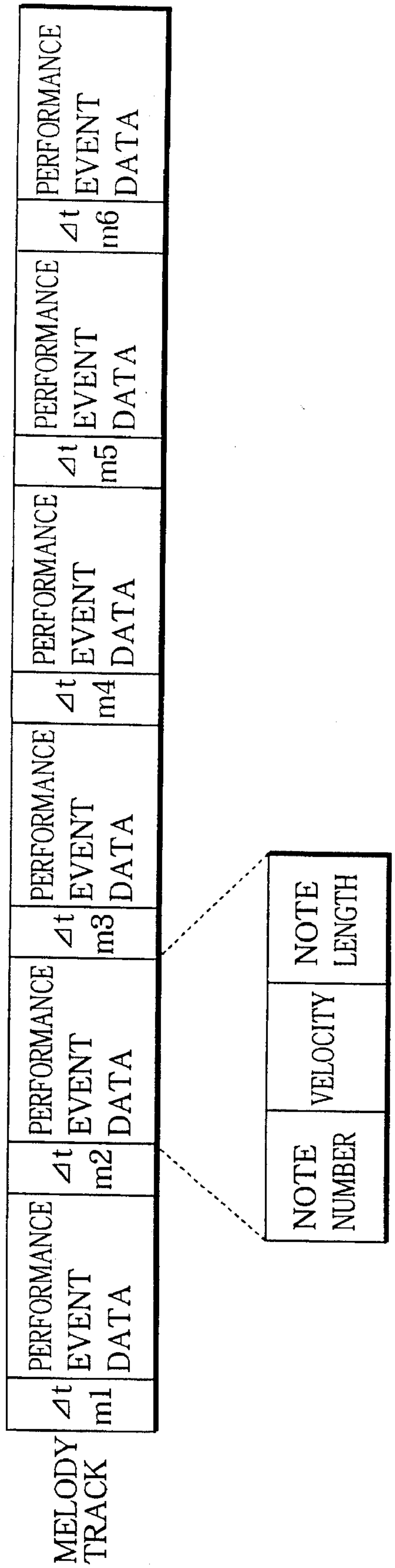
FIGS. 4A and 4B show configuration of accompaniment data contained in the song data.
Figure 4B:
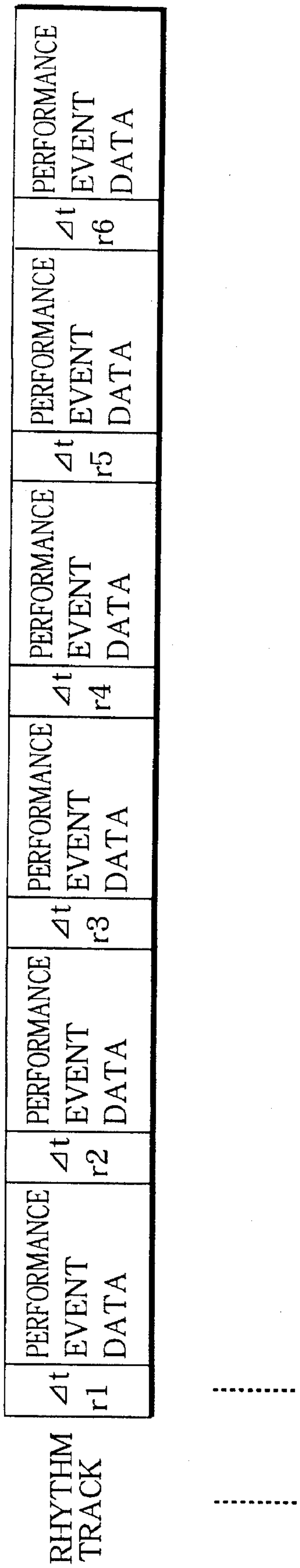

Now the configuration of the song data used in the karaoke apparatus of the present invention is described with referring to FIGS. 3 to 4B. FIG. 3 shows overall configuration of the song data, and FIGS. 4A and 4B show detailed configuration of accompaniment tracks of the song data. In FIG. 3, the song data of one piece comprises a header, an instrumental accompaniment track, a lyric track, a voice track, a DSP control track, a voice data block and a model singing voice data block. The header contains various index data relating to the karaoke song, including the title of the song, the genre of the song, the date of the release of the song, the performance time (length) of the song and so on. A CPU 10 (FIG. 1) determines a background video image to be displayed on a video monitor 26 based on the genre data by execution of a sequence program, and sends a chapter number of the video image to a LD changer 24. The background video image can be selected such that a video image of a snowy country is chosen for a Japanese ballad song having a theme relating to winter season, or a video image of foreign scenery is selected for foreign pop songs.

The instrumental accompaniment track shown in FIGS. 4A and 4B contains various part tracks including a melody track, a rhythm track and so on. These part tracks are accessed in parallel to each other to produce orchestra or full-band accompaniment. Sequence data composed of performance event data and duration data $\Delta t$ is written on each part track. The event data is fed to a sound source device 18 to command on and off of tone generation. The duration data Δt indicates a time interval between successive events. The CPU 10 executes a sequence program while counting the duration data Δt of each part track based on a common clock, and sends next event data from each part track when Δt is counted up to the sound source device 18. The sound source device 18 selects or assigns a tone generation channel to the received event data according to channel designation data which is determined by the CPU 10, and executes the event at the designated channel so as to generate an instrumental accompaniment of the karaoke song.

The remaining lyric track, voice track and DSP control track do not actually record instrumental sound data, but these tracks are described also in MIDI data format for easily integrating the data implementation. Namely, these tracks are composed of a sequence of event data and duration data likewise the accompaniment track. The class of data is system exclusive message in MIDI standard.

In the data description of the lyric track, a phrase of lyric is treated as one event of lyric display data. The lyric display data comprises character codes for the phrase of the lyric, display coordinates of each character, display time of the lyric phrase (about 30 seconds in typical applications), and sequence data. The "wipe" sequence data is to change the color of each character in the lyric phrase displayed on the video monitor 26 in relation to the progress of the song. The wipe sequence data comprises timing data (the time since the lyric is displayed) and position (coordinate) data of each character for the change of color within one lyric phrase.

The voice track is a sequence track to control generation timing of the voice data n (n=1,2,3 . . . ) stored in the voice data block. The voice data block stores human voices hard to synthesize by the sound source device 18, such as backing chorus and harmony voices. On the voice track, there are written voice designation data, pitch data and volume data. The voice designation data comprises a voice number which is a code number n (n=1,2,3 . . . ) to identify a desired item of the voice data recorded in the voice data block. The pitch and the volume data respectively specify the pitch and the volume of the voice data to be generated. Non-verbal backing chorus such as "Ahh" or "Wahwahwah" can be variably reproduced as many times as desired with changing the pitch and volume. Such a part is reproduced by shifting the pitch or adjusting the volume of the voice data registered in the voice data block. A voice data processor 19 controls an output level based on the volume data, and regulating the pitch by changing readout interval of the voice data based on the pitch data.

The DSP control track stores control data for an effector DSP 20 connected to the sound source device 18 and connected to the voice data processor 19. The main purpose of the effector DSP 20 is adding various sound effects such as reverberation and echo. The DSP 20 controls the effect on real time base according to the control data which is recorded on the DSP control track and which specifics the type and depth of the effect.

On the other hand, the model singing voice data is recorded by ADPCM (Adaptive Delta Pulse Code Modulation) to digitally sample a model singing voice of an original singer. The recorded voice data is read out in synchronism with the readout of the accompaniment data, and is transmitted to a voice converter DSP 30. Stated otherwise, vocal information representative of the model singing voice is read out in parallel to the accompaniment information.

FIG. 1 shows a schematic block diagram of the inventive karaoke apparatus having the voice conversion function. The CPU 10 to control the whole system is connected, through a system bus, to those of a ROM 11, a RAM 12, the hard disk drive (denoted as HDD) 17, an ISDN controller 16, a remote control receiver 13, a display panel 14, a switch panel 15, the sound source device 18, the voice data processor 19, the effect DSP 20, a character generator 23, the LD changer 24, a display controller 25, and the voice converter DSP 30. A score indicator 33 is connected to the DSP 30.

The ROM 11 stores a system program, an application program, a loader program and font data. The system program controls basic operation of the apparatus and data transfer between peripherals and the apparatus. The application program includes a peripheral device controller, a sequence program and so on. The sequence program is executed at the time of the karaoke performance to control the operations which include reading out event data at certain timings with counting the duration data from the sequence tracks and transmitting the read event data to a predetermined circuit block; and reading out the model singing voice data to transmit it to the voice converter DSP 30. Key transposition of the karaoke song tune is carried out by modifying or shifting a pitch of the event data included in the instrumental accompaniment track in response to operation of the switch panel 15. The loader program is executed to download requested song data from the host station. The font data is used to display lyrics and song titles. Various fonts such as 'Mincho', 'Gothic' etc. are stored as the font data. A work area is allocated in the RAM 12. The hard disk drive 17 stores song data files.

The ISDN controller 16 controls the data communication with the host station through ISDN network. The various data including the song data are downloaded from the host station. The ISDN controller 16 accommodates a DMA controller, which writes data such as the downloaded song data and the application program directly into the HDD 17 without control by the CPU 10.

The remote control receiver 13 receives an infrared signal modulated with control data from a remote controller 31, and decodes the received data. The remote controller 31 is provided with ten key switches, command switches such as a song selection switch and so on, and transmits the infrared signal modulated by codes corresponding to the user's operation of the switches. The switch panel 15 is provided on the front face of the karaoke apparatus, and includes a song code input switch, a song key change switch and so on.

The sound source device 18 generates the instrumental accompaniment sound according to the song data. The voice data processor 19 generates a voice signal having a specified length and pitch corresponding to the voice data included as ADPCM data in the song data. The voice data is a digital waveform data representative of backing chorus which is hard to synthesize by the sound source device 18, and therefore which is digitally encoded as it is. The instrumental accompaniment sound signal generated by the sound source device 18, the chorus voice signal generated by the voice data processor 19, and the singing voice signal generated by the voice converter DSP 30 are concurrently fed to the sound effect DSP 20. The effect DSP 20 adds various sound effects, such as echo and reverb to the instrumental accompaniment sound signal and the parallel voice signals. The type and depth of the sound effects added by the effect DSP 20 is controlled based on the DSP control data included in the song data. The DSP control data is fed to the effect DSP 20 at predetermined timings according to the DSP control sequence program under the control by the CPU 10. The effect-added instrumental accompaniment sound signal and the singing voice signal are converted into an analog audio signal by a D/A converter 21, and are then fed to an amplifier/speaker 22. The amplifier/speaker 22 constitutes an output device, and amplifies and reproduces the audio signal.

A microphone 27 constitutes an input device and collects or picks up an actual singing voice signal, which is fed to the voice converter DSP 30 through a preamplifier 28 and an A/D converter 29. The voice converter DSP 30 further receives the model singing voice signal which is input, by the CPU 10 in parallel to the actual singing voice signal. The DSP 30 modifies the pitch and volume of the model singing voice signal in response to the actual pitch and volume information of the karaoke singing voice signal. The modified model singing voice signal is transmitted as an output karaoke singing voice signal to the sound effect DSP 20.

The character generator 23 generates character patterns representative of a song title and lyrics corresponding to the input character code data. The LD changer 24 reproduces a background video image corresponding to the input video image selection data (chapter number). The video image selection data is determined based on the genre data of the karaoke song, for instance. As the karaoke performance is started, the CPU 10 reads the genre data recorded in the header of the song data. The CPU 10 determines a background video image to be displayed corresponding to the genre data and contents of the background video image. The CPU 10 sends the video image selection data to the LD changer 24. The LD changer 24 accommodates five laser discs containing 120 scenes, and can selectively reproduce 120 scenes of the background video image. According to the image selection data, one of the background video images is chosen to be displayed. The character data and the video image data are fed to the display controller 25, which superimposes them with each other and displays on the video monitor 26.

Figure 2:
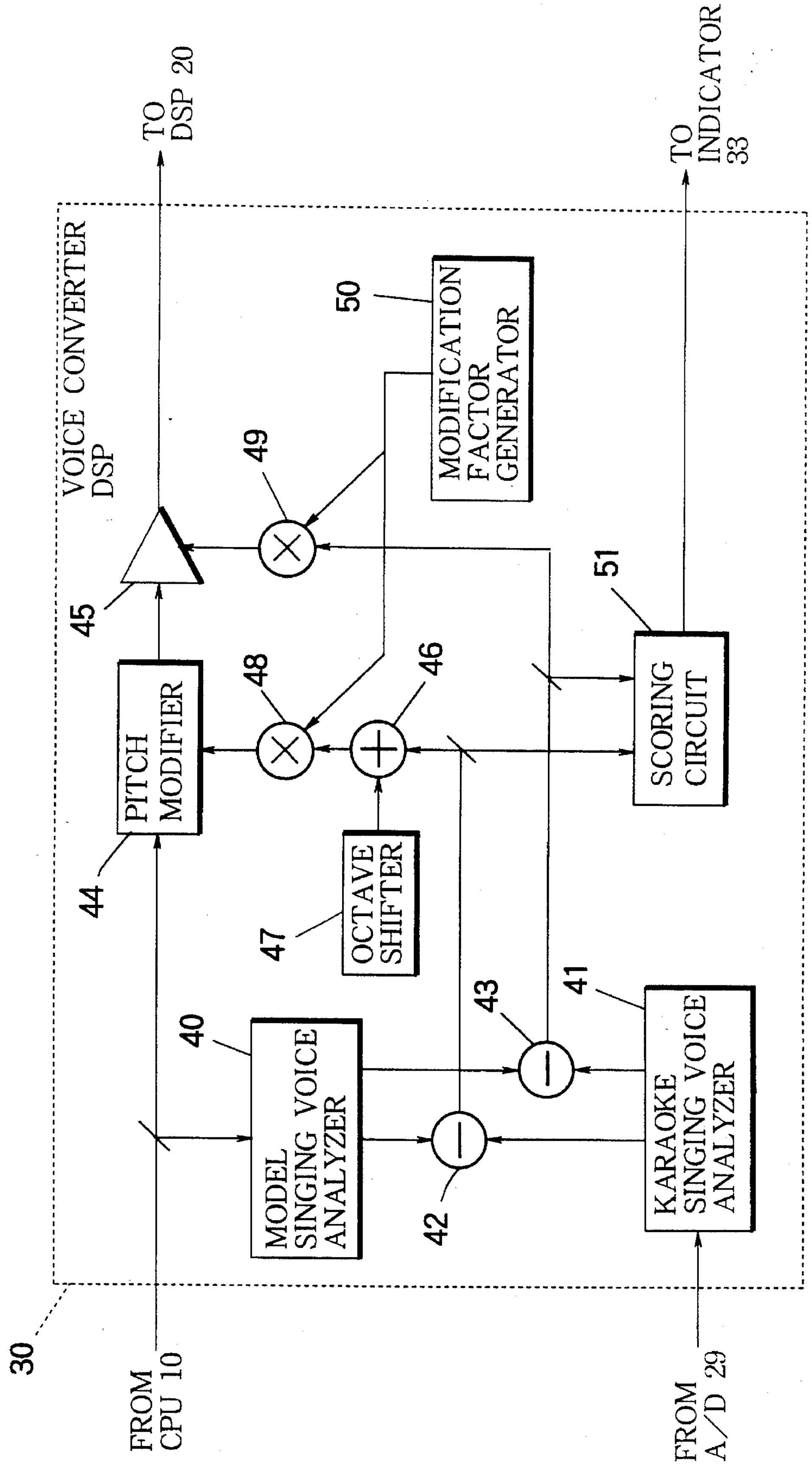
FIG. 2 shows structure of a voice converter DSP provided in the karaoke apparatus.

FIG. 2 shows the configuration of the voice converter DSP 30 which functions as a modifying device. The voice converter DSP 30 receives the actual singing voice signal of the karaoke player from the A/D converter 29, and concurrently receives the model singing voice signal under control of the CPU 10 during the course of the karaoke performance. The DSP 30 modifies the model singing voice signal to send the same to the sound effect DSP 20. The model singing voice signal is fed to a model singing voice analyzer 40. The model singing voice analyzer 40 analyzes the pitch and volume of the input model singing voice signal, and produces the analyzed information of the pitch and volume of the signal. The actual singing voice signal is fed to a karaoke singing voice analyzer 41. The karaoke singing voice analyzer 41 analyzes or detects the pitch and volume of the input karaoke singing voice signal, and produces the detected information of the actual pitch and volume of the signal. Respective pitch and volume information of the model and actual singing voices are subtracted from each other in subtracters 42 and 43 to yield difference data. The difference data are utilized to modify the pitch and volume of the model singing voice signal. Namely, the modifying device of DSP 30 comprises detecting means for detecting a volume difference and a pitch difference between the model singing voice and the actual singing voice, and modifying means for modifying the volume of the model singing voice according to the detected volume difference and for modifying the pitch of the model singing voice according to the detected pitch difference.

The difference data of the pitch information is fed to an adder 46. The adder 46 receives either of ±1 octave pitch values from an octave shifter 47 depending on situations for gender difference compensation. The purpose of the compensation is to remove an octave difference which may exist between the karaoke singing voice and the model singing voice in case that a female karaoke player sings a song originally for male, or a male karaoke singer sings a song originally for female. If a female karaoke player sings a song for male, −1 octave pitch value is input to the adder 46. If a male karaoke player sings a song for female, +1 octave pitch value is input to the adder 46 for gender compensation. Thus, it is possible to produce a male singing voice even if a female karaoke player sings a song originally for male, to produce a female singing voice in case a male karaoke player sings a song for female. Namely, the modifying device further comprises subtraction means in the form of the octave shifter 47 operative when there is a gender difference between the model singing voice and the actual singing voice for subtracting one octave from the detected pitch difference to provide an effective pitch difference which is used to cancel out the gender difference in modification of the model singing voice.

The effective difference data is sent from the adder 46 to a multiplier 48. The multiplier 48 multiplies a modification factor with the effective difference data. The factor is generated by a modification factor generator 50, and the factor value is set in the range from 0 to 1, which can be set by using the remote controller 31, for instance. The factor multiplication is introduced in order to avoid complete modification of the model singing voice signal in response to the actual karaoke singing voice signal, and in order to reserve the pitch and volume components of the model singing voice signal in the final audio signal. The pitch difference data multiplied with the modification factor is fed to a pitch modifier 44 as a pitch modification parameter. The pitch modifier 44 modifies the pitch of the model singing voice signal according to the pitch modification parameter. The pitch-modified model singing voice signal is sent to a volume modifier 45.

On the other hand, the difference data of the volume information is fed to a multiplier 49. The multiplier 49 multiplies a modification factor with the difference data. The modification factor value is generated by the modification factor generator 50 similarly to the modification factor for the multiplier 48. The factor is set in the range from 0 to 1. The modification factor for the multiplier 49 also determines the modification depth similarly to the factor for the multiplier 48, and the two modification factors for the multipliers 48 and 49 may have the same value, or may have different values. The volume difference data multiplied with the modification factor is fed to the volume modifier 45 as a volume modification parameter. The volume modifier 45 multiplies the volume modification parameter with the model singing voice signal. The resulted signal is transmitted to the sound effect DSP 20. Namely, the modifying device further comprises multiplication means for multiplying either of the detected volume difference and the detected pitch difference by a predetermined factor having a value in the range of 0 through 1 so as to determine modification depth of the model singing voice.

The pitch and volume difference data is sent to a scoring circuit 51. The scoring circuit 51 accumulates the difference data and produces score data at the end of the karaoke performance according to the accumulated value. The obtained score is displayed in the score indicator 33 (see FIG. 1). Namely, the karaoke apparatus further comprises a scoring device that evaluates performance of the karaoke player according to the detected volume difference and the detected pitch difference and that indicates a score according to results of evaluation.

The voice converter DSP 30 operates as described above, so that the model singing voice can be controlled in response to the actual karaoke singing voice, to thereby reproduce the controlled model singing voice as a final karaoke singing voice. Thus, it is possible to create a karaoke output as if the karaoke player is singing in the voice of the model or original singer.

In the embodiment above, the model singing voice is recorded as ADPCM data which is 16-bit digitized at 44.1 kHz. However, the data format of the model singing voice is not limited to that extent. It is possible to extract consonant and vowel elements from the original song and to store the extracted elements as phoneme data, which are used to synthesize the model singing voice by reading out the stored phoneme data in synchronism with the progress of the karaoke performance. In this variation, a tempo of the model singing voice can be adjusted during reproduction even if an actual tempo of the karaoke singing is changed.

According to the present invention, a karaoke singing voice signal is picked up by a microphone, and is digitized by an A/D converter. A CPU distributes a model singing voice signal of the original singer of the karaoke song. The model singing voice signal is reproduced from karaoke song data. Pitch and volume information is extracted from the karaoke actual singing voice signal and the model singing voice signal. The pitch and volume difference of the two singing voice signals are added to the model singing voice signal to modify the model singing voice signal to introduce deviation in pitch and volume. With this modification, the stored model singing voice signal is controlled in response to the actual singing voice of the karaoke player, so that the pitch and volume of the model singing voice signal is rendered similar to those of the actual karaoke singing voice signal. The modified model singing voice signal is reproduced in place of the actual karaoke singing voice. Thus, the finally reproduced singing voice signal maintains timbre of the model singer's voice, as well as the articulation of the karaoke the player.

What is claimed is:

1. A karaoke apparatus comprising:

a memory device that stores song data containing at least accompaniment information representative of a karaoke accompaniment of a desired song and vocal information representative of a model singing voice of the song performed by a model singer;

a producing device that processes the stored accompaniment information to produce the karaoke accompaniment;

an input device that collects an actual singing voice performed in parallel to the karaoke accompaniment by a karaoke player;

a reading device that reads out the vocal information from the memory device in parallel to the karaoke accompaniment;

a modifying device that modifies at least a volume and a pitch of the model singing voice represented by the read vocal information according to an actual volume and an actual pitch of the collected actual singing voice; and an output device that sounds the modified model singing voice in place of the collected actual singing voice and in parallel to the karaoke accompaniment.

2. A karaoke apparatus according to claim 1, wherein the modifying device comprises detecting means for detecting a volume difference and a pitch difference between the model singing voice and the actual singing voice, and modifying means for modifying the volume of the model singing voice according to the detected volume difference and for modifying the pitch of the model singing voice according to the detected pitch difference.

3. A karaoke apparatus according to claim 2, wherein the modifying device further comprises subtraction means operative when there is a gender difference between the model singing voice and the actual singing voice for subtracting one octave from the detected pitch difference to provide an effective pitch difference which is used to cancel out the gender difference in modification of the model singing voice.

4. A karaoke apparatus according to claim 2, wherein the modifying device further comprises multiplication means for multiplying either of the detected volume difference and the detected pitch difference by a predetermined factor having a value in the range of 0 through 1 so as to determine modification depth of the model singing voice.

5. A karaoke apparatus according to claim 2, further comprising a scoring device that evaluates performance of the karaoke player according to the detected volume difference and the detected pitch difference and that indicates a score according to results of evaluation.

6. A method of creating a singing voice along with a karaoke accompaniment, comprising the steps of:

storing song data containing at least accompaniment information representative of a karaoke accompaniment of a desired song and vocal information representative of a model singing voice of the song performed by a model singer;

processing the stored accompaniment information to produce the karaoke accompaniment;

collecting an actual singing voice performed in parallel to the karaoke accompaniment by a karaoke player;

reading out the vocal information from the memory device in parallel to the karaoke accompaniment;

modifying at least a volume and a pitch of the model singing voice represented by the read vocal information according to an actual volume and an actual pitch of the collected actual singing voice; and sounding the modified model singing voice in place of the collected actual singing voice and in parallel to the karaoke accompaniment.

* * * * *